(12) United States Patent
Shiraishi et al.

(10) Patent No.: US 7,073,480 B2
(45) Date of Patent: Jul. 11, 2006

(54) EXHAUST EMISSION CONTROL APPARATUS AND METHOD FOR INTERNAL COMBUSTION ENGINE

(75) Inventors: Taisuke Shiraishi, Yokohama (JP); Koji Hiraya, Yokohama (JP); Isamu Hotta, Yokohama (JP); Daisuke Tanaka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/246,208

(22) Filed: Oct. 11, 2005

(65) Prior Publication Data

US 2006/0075741 A1    Apr. 13, 2006

(30) Foreign Application Priority Data

Oct. 13, 2004   (JP)   ............................. 2004-298641

(51) Int. Cl.
    *F02B 17/00*   (2006.01)
(52) U.S. Cl. .................. 123/295; 123/305; 123/406.47; 60/274
(58) Field of Classification Search ................. 123/295, 123/298, 305, 406.47; 60/274, 285
    See application file for complete search history.

(56) References Cited

U.S. PATENT DOCUMENTS 5,967,113 A    10/1999   Kaneko et al.
6,263,666 B1*   7/2001   Kubo et al. .................. 60/277
6,935,989 B1*   8/2005   Shibagaki ..................... 477/98
6,968,677 B1*  11/2005   Tamura ........................ 60/277
6,978,204 B1*  12/2005   Surnilla et al. ............. 701/103
2003/0089101 A1*  5/2003   Tanaka et al. ................ 60/285
2005/0193980 A1*  9/2005   Doering ................. 123/406.47
2005/0193988 A1*  9/2005   Bidner et al. ............... 123/481
2005/0193997 A1*  9/2005   Cullen et al. ............... 123/698

FOREIGN PATENT DOCUMENTS

JP    10-169488 A    6/1998

* cited by examiner

*Primary Examiner*—John T. Kwon
(74) *Attorney, Agent, or Firm*—Foley & Lardner LLP

(57) ABSTRACT

An exhaust emission control apparatus for an internal combustion engine includes a fuel injection valve placed substantially at a midpoint above a combustion chamber of the engine; a piston having an outer cavity formed substantially in a midsection of an upper surface of the piston and an inner cavity formed in a bottom surface of the outer cavity; an ignition plug placed in a region right above the outer cavity; an exhaust purifying catalyst provided in an exhaust passage of the engine; and a controller. This controller is configured to carry out a stratified charge combustion when a temperature rise for the exhaust purifying catalyst is required, by forming air-fuel mixture which is richer than stoichiometric ratio and is able to be ignited by the ignition plug, within the outer cavity and in an area substantially right above the outer cavity, from a fuel injected through the fuel injection valve.

21 Claims, 9 Drawing Sheets

NORMAL STRATIFIED COMBUSTION

FIG.5B

REQUEST FOR CATALYST'S TEMP. RISE

FIG.6

FIG. 7A — PATTERN1: NOT SPLIT

FIG. 7B — PATTERN2: SPLIT FUEL INJECTION

FIG. 7C — PATTERN3: SPLIT FUEL INJECTION

FIG.8

EXHAUST EMISSION CONTROL APPARATUS AND METHOD FOR INTERNAL COMBUSTION ENGINE

BACKGROUND OF THE INVENTION

The present invention relates to exhaust emission control apparatus and method for a direct-injection and spark-ignition type internal combustion engine. More particularly, the present invention relates to a temperature rising technique for early activating an exhaust purifying catalyst provided in an exhaust passage.

There is an internal combustion engine which performs a lean burn by injecting fuel directly into a cylinder from a fuel injection valve and then forming stratified air-fuel mixture within the cylinder at the time of a spark-ignition combustion. Such an internal combustion engine can reduce fuel consumption specifically under a low or middle load condition. Moreover, some earlier technologies with respect to the above-mentioned direct-injection and spark-ignition type internal combustion engine, have been proposed to accelerate the activation of the exhaust purifying catalyst during a cold start and a warm-up process of the engine.

A Japanese Patent Application Provisional Publication No. H10(1998)-169488 published on Jun. 23, 1998 exemplifies a previously proposed technique to promote the activation of the exhaust purifying catalyst. In this technique, an incomplete combustion substance CO (carbon monoxide) is produced by causing a local air/fuel ratio around an ignition plug to be over-rich, when the exhaust temperature rise is required. Thereby, remaining oxygen within the cylinder which has not been associated with the combustion, reacts with the produced CO after a main burning.

SUMMARY OF THE INVENTION

However, in this previously proposed direct-injection and spark-ignition type internal combustion engine; the fuel injection valve is located at the (lateral) side of a combustion chamber, and fuel is injected obliquely into the combustion chamber. Then the fuel is carried to a neighborhood of the ignition plug by a piston. In this case, the fuel mixes with ambient air and comes to be the air-fuel mixture. Hence, it is favorable that a period for mixing with air is shortened by retarding an injection timing, in order to allow the air/fuel ratio around the ignition plug to be over-rich. In such a case, it is conceivable that an unburned hydrocarbon HC is produced more than the incomplete combustion substance CO, and moreover the generation of smoke is increased; since ignition is carried out before the fuel spray has sufficiently evaporated.

In other words, in the case of such a side injection, fuel diffuses gradually, and then the air-fuel mixture becomes in a leaner state as time goes by. Under a normal driving condition, the time interval between the fuel injection timing and an ignition timing (injection-ignition interval) is set to bring the local air-fuel mixture to stoichiometric air/fuel ratio. In contrast, in order to cause this air-fuel mixture to be over-rich, it is favorable that the injection-ignition interval is shortened in comparison with that in the normal driving condition. Thereby, the evaporation of fuel tends to be insufficient under the over-rich condition.

Further, it is also conceivable that a partial rich-misfire occurs and thereby a combustion stability deteriorates. Hence, there is a possibility that a setting range of the ignition timing which is an important factor for the exhaust temperature rise is narrowed. It is, therefore, an object of the present invention to provide exhaust emission control apparatus and method devised to effectively accelerate the early activation of the exhaust purifying catalyst.

According to one aspect of the present invention, there is provided an exhaust emission control apparatus for an internal combustion engine, comprising: a fuel injection valve placed substantially at a midpoint above a combustion chamber of the engine; a piston having an outer cavity formed substantially in a midsection of an upper surface of the piston and an inner cavity formed in a bottom surface of the outer cavity; an ignition plug placed in a region right above the outer cavity; an exhaust purifying catalyst provided in an exhaust passage of the engine; and a controller configured to carry out a stratified charge combustion when a temperature rise for the exhaust purifying catalyst is required, by forming air-fuel mixture which is richer than stoichiometric ratio and is able to be ignited by the ignition plug, within the outer cavity and in an area substantially right above the outer cavity, from a fuel injected through the fuel injection valve.

According to another aspect of the present invention, there is provided an exhaust emission control apparatus for an internal combustion engine, comprising: a fuel injection valve placed substantially at a midpoint above a combustion chamber of the engine; a piston having an outer cavity formed substantially in a midsection of an upper surface of the piston and an inner cavity formed in a bottom surface of the outer cavity; an ignition plug placed in a region right above the outer cavity; an exhaust purifying catalyst provided in an exhaust passage of the engine; and a controller configured to carry out a stratified charge combustion when a temperature rise for the exhaust purifying catalyst is required, by forming air-fuel mixture within the outer cavity and in an area substantially right above the outer cavity from a fuel injected through the fuel injection valve and allowing the ignition plug to ignite the air-fuel mixture after a compression top dead center.

According to still another aspect of the present invention, there is provided an exhaust emission control apparatus for an internal combustion engine, comprising: injection means for injecting fuel, being placed substantially at a midpoint above a combustion chamber of the engine; a piston having an outer cavity formed substantially in a midsection of an upper surface of the piston and an inner cavity formed in a bottom surface of the outer cavity; ignition means for igniting air-fuel mixture, being placed in a region right above the outer cavity; an exhaust purifying catalyst provided in an exhaust passage of the engine; and control means for carrying out a stratified charge combustion when a temperature rise for the exhaust purifying catalyst is required, by forming the air-fuel mixture which is richer than stoichiometric ratio and is able to be ignited by the ignition means, within the outer cavity and in an area substantially right above the outer cavity, from the fuel injected through the injection means.

According to still another aspect of the present invention, there is provided an exhaust emission control method for an internal combustion engine including a piston having an outer cavity formed substantially in a midsection of an upper surface of the piston and an inner cavity formed in a bottom surface of the outer cavity, an ignition plug placed in a region right above the outer cavity, and an exhaust purifying catalyst provided in an exhaust passage of the engine, the exhaust emission control method comprising: carrying out a stratified charge combustion when a temperature rise for the exhaust purifying catalyst is required, by forming air-fuel mixture which is richer than stoichiometric ratio and is able to be ignited by the ignition plug within the outer cavity and in an area substantially right above the outer cavity.

The other objects and features of this invention will become understood from the following description with reference to the accompanying drawings.

DETAILED DESCRIPTION OF THE INVENTION

Reference will hereinafter be made to the drawings in order to facilitate a better understanding of the present invention.

Figure 1:
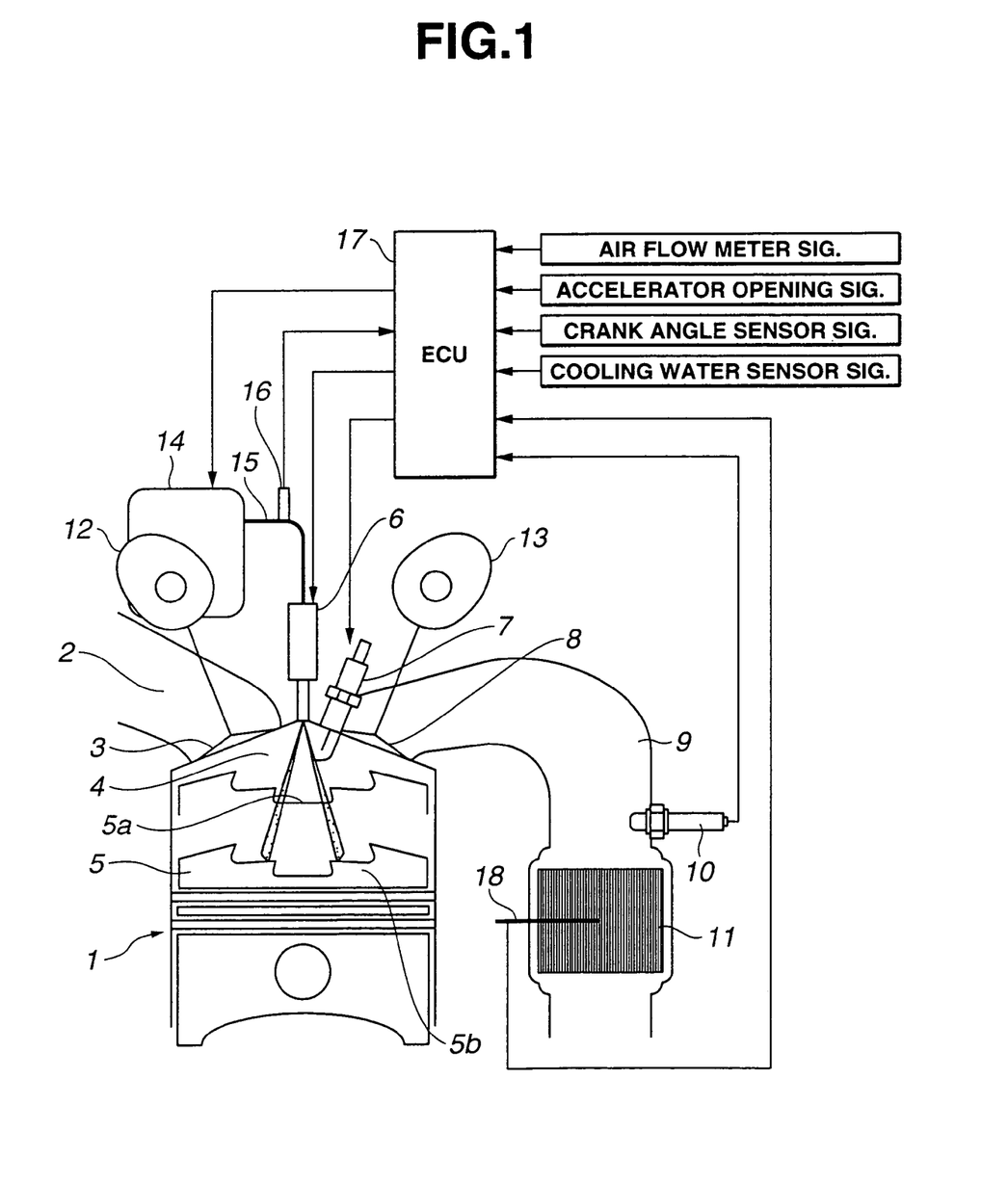
FIG. 1 is a schematic diagram representing a configuration of an exhaust emission control apparatus according to the present invention.

FIG. 1 is a schematic diagram representing a configuration of an exhaust emission control apparatus for an internal combustion engine according to the present invention. At first, a first embodiment of the exhaust emission control apparatus according to the present invention will now be explained.

An internal combustion engine 1 sucks fresh air from an intake port 2 into a combustion chamber 4 when an intake valve 3 is open. A piston 5 which does a reciprocating motion, is provided below combustion chamber 4. On the other hand, a fuel injection valve 6 and an ignition plug (spark plug) 7 are provided above combustion chamber 4. Fuel injection valve 6 carries out a fuel injection, and ignition plug 7 ignites air-fuel mixture. Fuel injection valve 6 is placed (attached) substantially at a midpoint above combustion chamber 4 so that fuel injection valve 6 faces in a downward direction. Ignition plug 7 is placed in a region right above after-mentioned cavities 5a and 5b so that ignition plug 7 protrudes in an obliquely downward direction and sits in proximity to fuel injection valve 6. Moreover, fuel injection valve 6 is a hole nozzle (type) injection valve which has a strong directivity and does not greatly vary a spray form (or, injection form) of fuel even when a cylinder pressure has been increased in the latter half of a compression stroke.

Substantially in the midsection of an upper (crown) surface of piston 5, an inner cavity 5a and an outer cavity 5b are formed in an in-and-out double layer. In other words, inner cavity 5a having small (minor) diameter is formed in the midsection of a bottom surface of outer cavity 5b having large (major) diameter. Thereby, at the time of execution of the fuel injection during the compression stroke, a circulating flow is formed within inner cavity 5a or outer cavity 5b along the corresponding cavity's shape, by momentum which the injected fuel spray has.

An exhaust gas produced after the combustion is exhausted to an exhaust passage 9 when an exhaust valve 8 is open. An exhaust air/fuel ratio sensor 10 is provided at exhaust passage 9, and an exhaust purifying catalyst 11 is provided in exhaust passage 9 downstream from exhaust air/fuel ratio sensor 10. Further, a catalyst temperature sensor 18 is provided at exhaust purifying catalyst 11 to sense a temperature of the exhaust purifying catalyst 11. The intake valve 3 and exhaust valve 8 are driven by respectively an inlet cam 12 and an exhaust cam 13. At the axial end of inlet cam 12, a high-pressure fuel pump 14 is provided, and is driven by inlet cam 12. The fuel pressurized by high-pressure fuel pump 14 is guided to fuel injection valve 6 through a fuel line (fuel pipe) 15. Moreover, a fuel pressure sensor 16 to sense a fuel pressure for injecting fuel is provided at fuel line 15.

Internal combustion engine 1 is controlled in an integrated control by an engine control unit (ECU) 17. Hence, ECU 17 receives signals from an air flow meter (not shown) for sensing an intake air quantity, an accelerator opening (degree) sensor, a crank angle sensor, a cooling water temperature sensor, exhaust air/fuel ratio sensor 10, fuel pressure sensor 16, and catalyst temperature sensor 18. Then, ECU 17 controls fuel injection valve 6, ignition plug 7, fuel pump 14 and the like, on the basis of these received signals.

In this embodiment, a combustion mode (combustion pattern) in engine 1 is broadly divided into two modes. One is a stratified charge combustion mode; in which a stratified air-fuel mixture is formed (or charged) around ignition plug 7 by carrying out the fuel injection during the compression stroke, then this mixture is ignited and burnt, and thereby fuel economy is improved because of achievement of lean (mixture) driving. Another is an uniform combustion mode; in which an uniform (i.e., homogeneous) air-fuel mixture is formed within the whole of combustion chamber 4 by carrying out the fuel injection during a suction stroke, then this mixture is ignited and burnt, and thereby stoichiometric (mixture) driving is performed. These two modes are selected according to driving conditions. In general, the stratified charge combustion mode is selected under the condition of lower rotation speed or lower load side, and uniform combustion mode is selected under the condition of higher rotation speed or higher load side.

In the case of the stratified charge combustion mode; in relatively-low-load driving region within this predetermined driving region (or condition) in which stratified charge combustion should be carried out, fuel is injected into inner cavity 5a by retarding a fuel injection timing with respect to the position of piston 5. The fuel spray collides against a bottom surface of inner cavity 5a, and moves upwardly along a side wall of inner cavity 5a from the bottom surface. Thereby, a relatively small stratified air-fuel mixture is formed right above inner cavity 5a. Namely, the combustible stratified air-fuel mixture is formed within inner cavity 5a and in an area substantially right above inner cavity 5a. On the other hand, in relatively-high-load driving region within the predetermined driving region in which the stratified charge combustion should be carried out, fuel is injected into outer cavity 5b by advancing the fuel injection timing with respect to the position of piston 5. Thereby, a relatively large stratified air-fuel mixture is formed right above outer cavity 5b. Namely, the combustible stratified air-fuel mixture is formed within outer cavity 5b and in an area substantially right above outer cavity 5b.

Figure 2A:
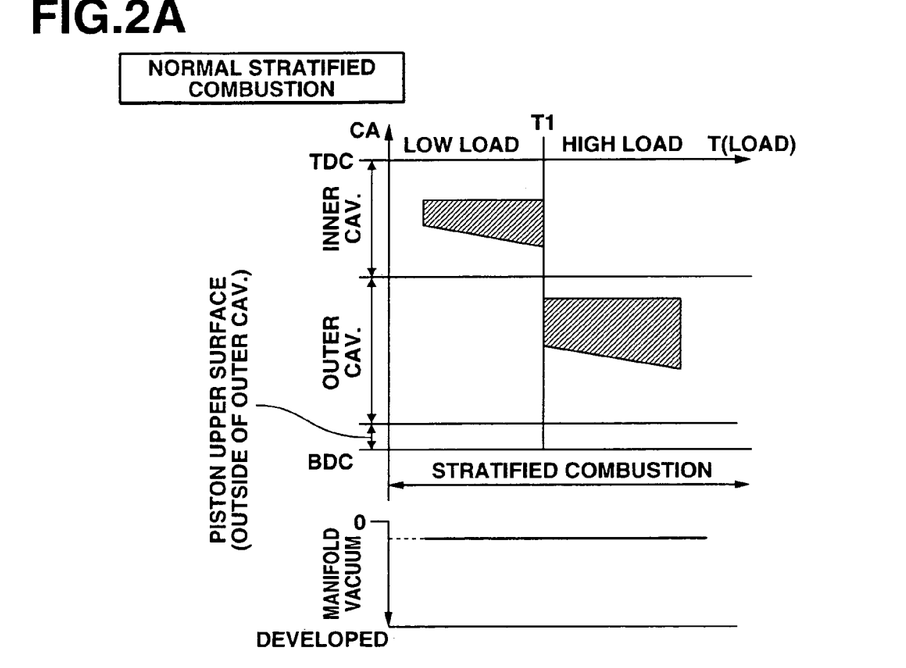
FIGS. 2A and 2B are control characteristic views in a first embodiment of the exhaust emission control apparatus according to the present invention.
Figure 2B:
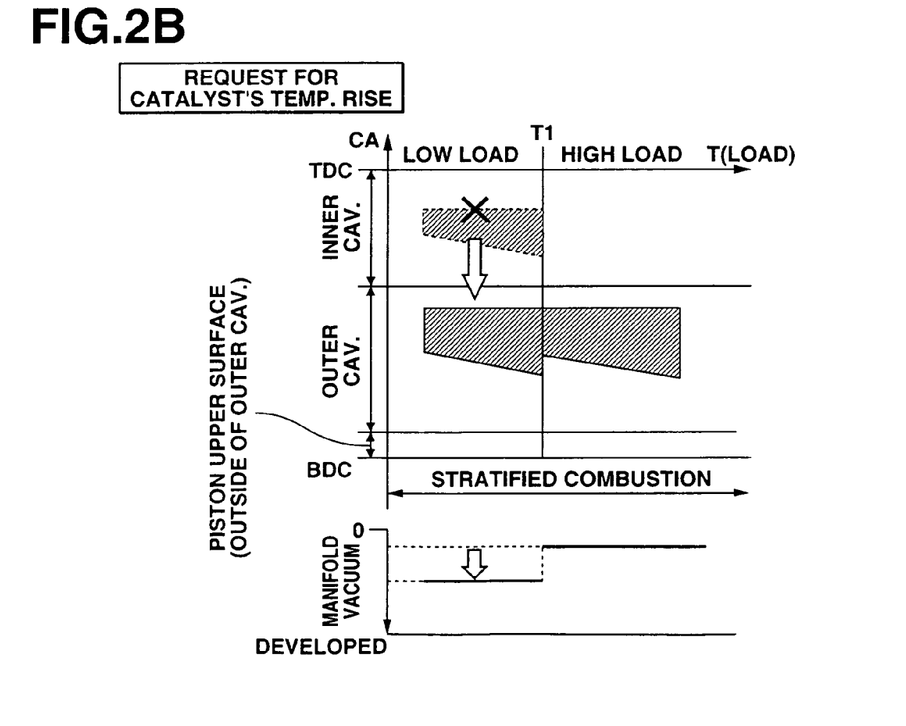

In this embodiment, while temperature rise of the exhaust purifying catalyst is required, the fuel injection timing and a fuel injection quantity are varied in contrast with the case of the above-mentioned normal stratified charge combustion where the temperature rise of the exhaust purifying catalyst is not required. FIG. 2A shows a control for the fuel injection timing and fuel injection quantity relative to the engine load in the case of the normal stratified charge combustion, in the first embodiment according to the present invention. FIG. 2B shows a control for the fuel injection timing and fuel injection quantity relative to the engine load in the case where the catalyst's temperature rise is required, in the first embodiment according to the present invention.

At first, the explanation about the case of the normal stratified charge combustion (FIG. 2A) is as follows. When the engine load is lower than a predetermined load T1 (i.e., in relatively-low-load driving region), only onetime fuel injection is carried out in the latter half of the compression stroke. Then, a start timing of the fuel injection is more advanced as the load is increased. This fuel injection (start) timing is set so that the (injected) fuel spray can be received by inner cavity 5a, as shown in FIG. 2A. Moreover, when the engine load is equal to or higher than predetermined load T1 (i.e., in relatively-high-load driving region), only one-time fuel injection is carried out in the first half of the compression stroke. Then, the start timing of the fuel injection is more advanced as the load is increased. This fuel injection (start) timing is set so that the fuel spray can be received by outer cavity 5b, as shown in FIG. 2A. In addition, predetermined load T1 is a load value predetermined so as to be lower than a load value for which the air-fuel mixture (mass) formed by the onetime fuel injection using inner cavity 5a becomes too rich (i.e., over-rich in fuel). Namely, predetermined load T1 is predetermined so as not to allow the air-fuel mixture (mass) formed right above inner cavity 5a by the fuel injection carried out during the latter half of the compression stroke, to become too rich.

Next, the explanation about the case where the catalyst's temperature rise is required (FIG. 2B) is as follows. When the engine load is lower than predetermined load T1 (i.e., in relatively-low-load driving region), the fuel injection timing is set in the first half of the compression stroke so that outer cavity 5b can receive the fuel spray, although this driving region is using inner cavity 5a in the case of the normal stratified charge combustion. For information, in this driving region of the case of the normal stratified charge combustion, the stratified charge combustion is being carried out while causing an average air/fuel ratio within the combustion chamber to range about from 40 to 50. Moreover in this case where the catalyst's temperature rise is required, the fuel injection quantity is increased as compared to that (i.e., its quantity) for the normal stratified charge combustion in order to form combustible mixture within outer cavity 5b and (in the area) right above outer cavity 5b. Furthermore, a manifold vacuum is developed by reducing the intake air quantity for the engine as compared to that (i.e., its value) of the case of the normal stratified charge combustion, in order to allow the load (or, output power) to accord with that of the case of the normal stratified charge combustion. Namely in this case where the catalyst's temperature rise is required, the stratified charge combustion is performed without varying the engine load, while causing the average air/fuel ratio within the combustion chamber to range about from 20 to 30, as shown in FIG. 2B.

Figure 3:
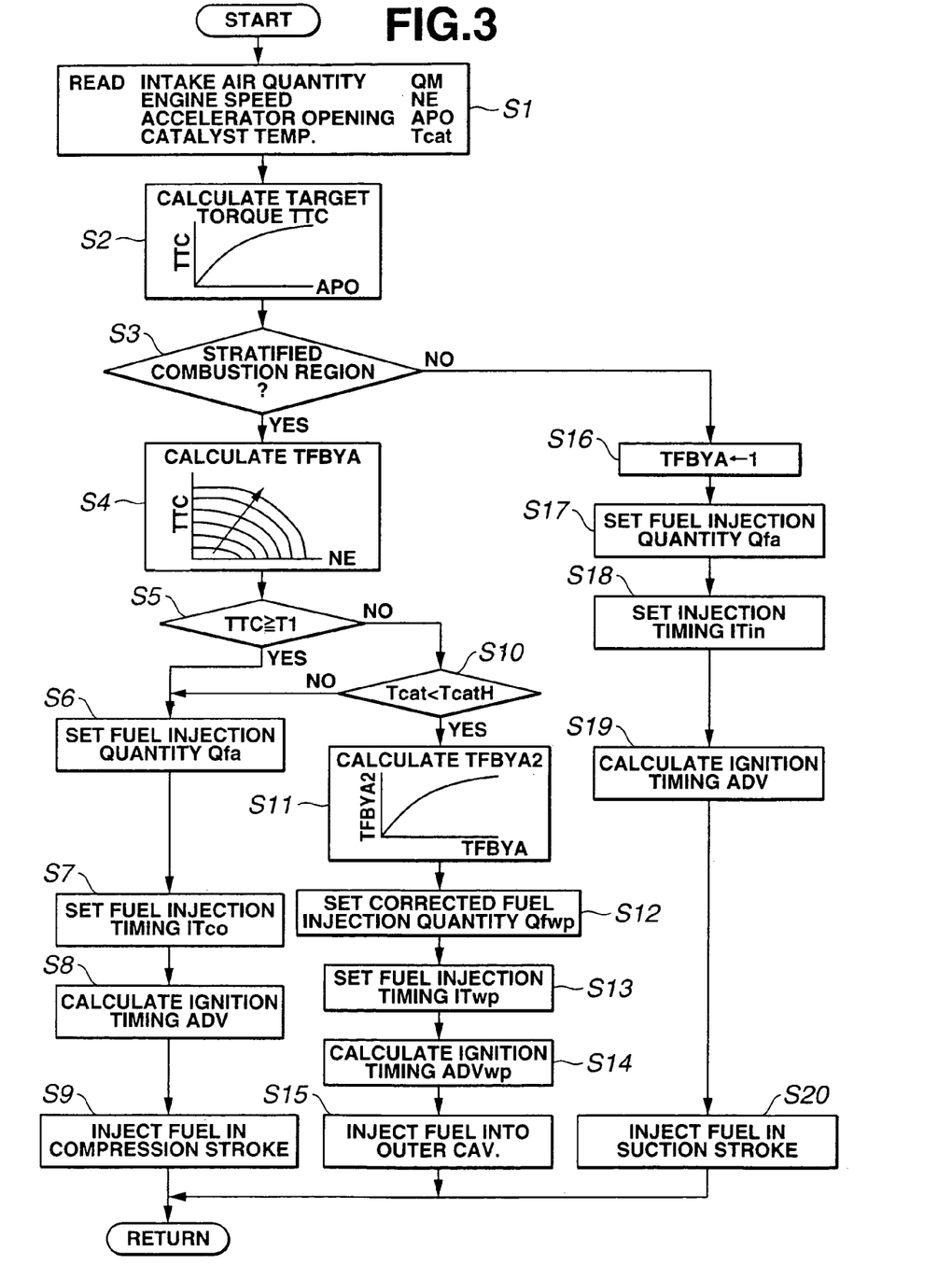
FIG. 3 is a flowchart showing a control process in the first embodiment according to the present invention.
Figure 4A:
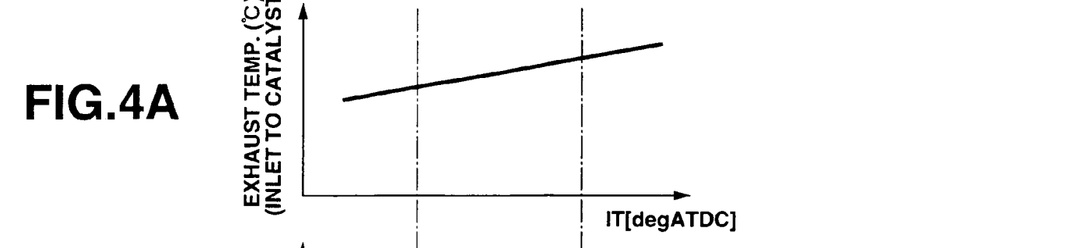
FIGS. 4A–4E are views showing effects of the exhaust emission control apparatus according to the present invention.
Figure 4B:
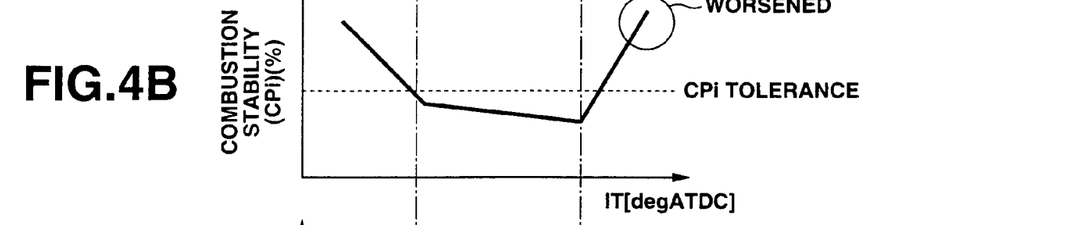
Figure 4C:
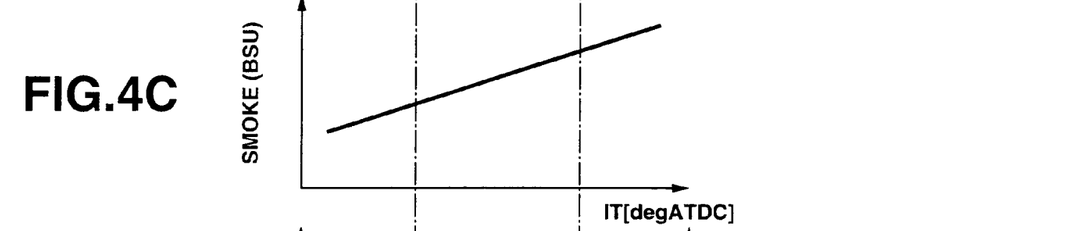
Figure 4D:
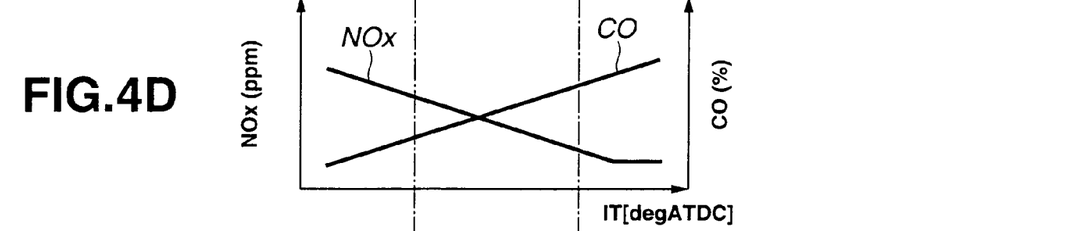
Figure 4E:
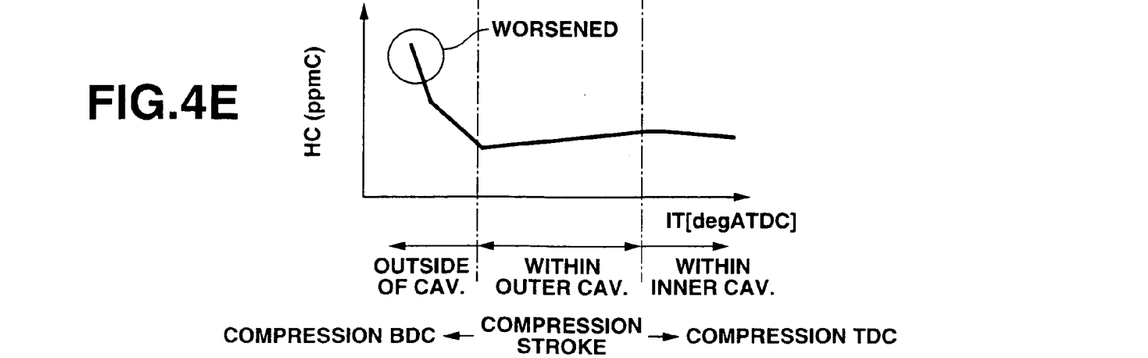

FIG. 3 is a flowchart showing a control process in ECU 17 in this first embodiment. At step S1, the controller (ECU 17) reads intake air quantity QM, engine rotation speed NE, an accelerator opening APO, and a catalyst temperature Tcat. At next step S2, the controller calculates a target torque TTC in accordance with accelerator opening APO, for example, by looking up previously stored table data. Next at step S3, the controller determines (judges) whether the stratified charge combustion mode should be selected or the uniform combustion mode should be selected, on the basis of the driving condition of engine 1. Namely, the controller judges whether the current driving condition of engine 1 is in the stratified charge combustion region or not (i.e., or in the uniform combustion region). In addition, the judgment between these combustion modes is made on the basis of a previously stored map which shows the experimentally obtained relationship of the combustion modes to the engine speed and the engine load (e.g., the target torque).

If YES at step S3, namely if the controller determines that the stratified charge combustion mode should be selected, the program proceeds to step S4. At step S4, the controller calculates a target fuel-air ratio TFBYA in accordance with engine rotation speed NE and target torque TTC, for example, by looking up a previously stored map. Target fuel-air ratio TFBYA is a value corresponding to the reciprocal of an excess air ratio A. Next at step S5, the controller determines whether or not the current target torque TTC is equal to or larger than T1. This T1 is the above-mentioned threshold value of the load, shown in FIGS. 2A and 2B.

If the controller determines that the relationship TTC≧T1 is established at step S5, namely if in the relatively-high-load driving region (of the stratified charge combustion region); the program proceeds to steps S6–S9 and accordingly the normal stratified charge combustion is performed. Concretely, the controller sets fuel injection quantity Qfa at step S6, sets fuel injection timing ITco at step S7, sets an ignition timing ADV at step S8, and carries out the fuel injection in the compression stroke at step S9. In detail, at step S6, fuel injection quantity Qfa is set by multiplying a basic fuel injection quantity by target fuel-air ratio TFBYA and then correcting the multiplied value. This basic fuel injection quantity corresponds to a stoichiometric amount, and is determined from intake air quantity QM and engine speed NE (K×QM/NE; K is a constant).

Moreover, at step S7, fuel injection timing ITco is set in accordance with the load (e.g., by looking up the table referring to the load), as shown in FIG. 2A. Accordingly, in the case of TTC≧T1 (relatively-high-load), fuel injection timing ITco is set in the first half of the compression stroke, and hence fuel is injected into outer cavity 5b. Moreover, at step S8, ignition timing ADV is set, for example as a MBT (minimum advance for best torque) setting, by looking up a map referring to engine speed NE and the load.

If the relationship TTC<T1 is established at step S5 (NO at step S5), namely if in the relatively-low-load driving region (of the stratified charge combustion region); the program proceeds to step S10. Then the controller judges whether or not current catalyst temperature Tcat is lower than a catalyst's activation temperature TcatH, namely Tcat<TcatH. If NO at step S10, namely if the controller determines that catalyst temperature Tcat has reached activation temperature TcatH; the program proceeds to steps S6–S9 and accordingly the normal stratified charge combustion is performed. Concretely, the controller sets fuel injection quantity Qfa at step S6, sets fuel injection timing ITco at step S7, sets ignition timing ADV at step S8, and carries out the fuel injection in the compression stroke at step S9. Since the relationship TTC<T1 is established (relatively-low-load) in this case, fuel injection timing ITco is set in the latter half of the compression stroke, and hence fuel is injected into inner cavity 5a.

If YES at step S10, namely if the controller determines that catalyst temperature Tcat has not reached activation temperature TcatH; the controller determines that the catalyst's temperature rise is being required, and the program proceeds to steps S11–S15. Accordingly, the controller performs the catalyst's temperature rise control for raising an exhaust gas temperature. In detail, the controller calculates a corrected fuel-air ratio TFBYA2 on the basis of current target fuel-air ratio TFBYA at step S11. Corrected fuel-air ratio TFBYA2 is a fuel-air ratio needed to form the combustible air-fuel mixture above outer cavity 5b and also to produce (or, output) the target torque. At next step S12, the controller sets a corrected fuel injection quantity Qfwp according to corrected fuel-air ratio TFBYA2 (i.e., increase in fuel injection quantity). Then, the controller sets a fuel injection timing ITwp in the first half of the compression stroke as shown in FIG. 2B, at step S13. Then, controller sets an ignition timing ADVwp at step S14 (in the similar manner as step S8 or later-mentioned step Sa 14), and carries out the fuel injection into outer cavity 5b during the compression stroke at step S15. If the answer of step S3 is NO, namely if the controller determines that the uniform combustion mode should be selected; the program proceeds to step S16.

The controller sets target fuel-air ratio TFBYA to equal to 1 at step S16, and sets fuel injection quantity Qfa at next step S17 in the similar manner as step S6. Next, the controller sets a fuel injection timing ITin for the uniform combustion to some timing in the suction stroke, at step S18. This setting is also done by looking up a map based on engine speed NE and the load. Then, the controller sets ignition timing ADV at step S19, and injects fuel during the suction stroke at step S20.

When temperature rise for the exhaust purifying catalyst is required in this first embodiment; the combustible air-fuel mixture is formed within the outer cavity and in the area substantially right above the outer cavity and then the stratified charge combustion is performed, even in the load (driving) region in which the inner cavity is used in the case of the normal stratified charge combustion. For example at the time of a fast idle of the engine; in normal times, the combustible air-fuel mixture is formed within the inner cavity of the double-layer cavity and in the area right above the inner cavity, and then the stratified charge combustion is performed with the average air/fuel ratio inside the combustion chamber being in the range about from 40 to 50. However even in such a driving region; the fuel quantity capable of forming the combustible air-fuel mixture within the outer cavity and in the area right above the outer cavity is injected into the outer cavity through the fuel injection valve and the manifold vacuum is developed by narrowing a throttle, when the catalyst's temperature rise is required in this embodiment. Thereby, the stratified charge combustion is controlled to be carried out with the average air/fuel ratio inside the combustion chamber being in the range about from 20 to 30, without varying the engine load (output). Therefore, long time interval between the fuel injection timing and the ignition timing (injection-ignition interval) can be secured and thereby sufficient time for the fuel evaporation can be secured. Moreover, the exhaust (gas) temperature can be increased without worsening the emission of unburned hydrocarbon HC. Although it is conceivable that the increase in exhaust temperature can be obtained also by carrying out the uniform combustion, this uniform combustion involves an increase in HC emission since HC which flows on a wall inside the cylinder and the like is increased.

Moreover in the case of the above-mentioned stratified charge combustion (i.e., when the catalyst's temperature rise is required under the relatively-low-load driving condition), the fuel injection quantity which causes the air-fuel mixture formed within the outer cavity and in the area right above the outer cavity to have an air/fuel ratio richer (in terms of fuel) than the stoichiometric ratio and also capable of being stably ignited by the ignition plug at its ignition timing is injected into the outer cavity. Namely in this case, since the air-fuel mixture around the ignition plug has air/fuel ratio richer than the stoichiometric ratio at its ignition timing, incomplete combustion materials or substances CO (carbon monoxide) and H2 (hydrogen) are produced at the time of a main combustion (i.e., main burning). Hence, these substances react or re-burn with oxygen existing within the air remaining after the main combustion, during an expansion stroke and an exhaust stroke of the engine. In addition, these substances also react inside the exhaust passage upstream from the catalyst. Thereby, the exhaust gas temperature can be increased. Moreover, the emission of unburned fuel HC can be suppressed since an afterburning (i.e., a burning which occurs after the main combustion) of the HC is also promoted.

Further, since the air-fuel mixture formed within the outer cavity and in the area right above the outer cavity has air/fuel ratio which is richer than the stoichiometric ratio and which enables the mixture to be ignited; the probability that a mixture having a rich air/fuel ratio and a good ignitability exists around the ignition plug even during the expansion stroke after a compression top dead center (of the piston), becomes higher. Hence, the combustion stability is enhanced. Thereby, the appropriate setting range for the ignition timing becomes wider after the compression top dead center, hence the ignition timing which is an important factor for the exhaust temperature rise can be set to the side more retarded from the compression top dead center. Namely, the ignition plug can be allowed to ignite the air-fuel mixture at more retarded timing after the compression top dead center. Therefore, the effect of the exhaust temperature rise and the HC reduction can be more promoted.

Further in this case, both of a fuel quantity for corresponding to the load required as a work, e.g., at the time of the fast idle after a cold engine start or at the time of a running readily after the cold engine start (which are conceivable situations where the catalyst's temperature rise is being required), and a fuel quantity for being used for energy (i.e., afterburning) needed for the exhaust temperature rise are injected into the outer cavity. Thus by injecting fuel into the outer cavity inside the cylinder; the mixture having air/fuel ratio richer than the stoichiometric ratio and also capable of being ignited can be formed around the ignition plug, and moreover the deterioration in combustion stability and the generation of smoke which are caused by becoming over-rich around the ignition plug can be suppressed.

Here as one example, FIGS. 4A~4E show experimental results at the time of the fast idle after the cold engine start. These results are obtained under the same conditions of the ignition timing (after the compression top dead center) and the average air/fuel ratio within the combustion chamber (weakly lean). Under such a load, in the case where all the fuel is injected into the inner cavity, the exhaust gas temperature can be increased most of three cases with the HC emission being lowered as shown in FIGS. 4A~4E. This is because the CO increases and the afterburning is promoted in this case. However, the combustion stability deteriorates (is worsened) and the generation of smoke is increased as shown in FIGS. 4A~4E, hence it can be estimated that the area around the ignition plug is in the over-rich state. Next, in the case where all the fuel is injected outside the outer cavity (i.e., into whole upper surface of the piston), both of the combustion stability and the HC emission are worsened and the exhaust gas temperature is lowest of the three cases as shown in FIGS. 4A~4E. It can be estimated that this result is caused by the following reasons. The air-fuel mixture has diffused when igniting the mixture because the fuel has not existed (is not kept) inside the (inner or outer) cavity, and thereby the area around the ignition plug becomes in a lean state. As a result, the combustion stability deteriorates due to deterioration of an ignition stability. Moreover, the main combustion is a lean burn in this case. Thereby, the afterburning of unburned substances (or, components) is not promoted since the generation of CO decreases. In addition, the HC which flows on the wall (of the cylinder and the like) is increased since the fuel is not kept within the inner or outer cavity after the fuel injection. As a result, the HC emission deteriorates. Next, in the case where all the fuel is injected into the outer cavity, it becomes possible to cause the area around the ignition plug to have air/fuel ratio richer than the stoichiometric ratio and capable of being ignited stably. Thereby, the HC emission can be suppressed by a maximum degree with a favorable combustion stability and the exhaust gas temperature can be increased as shown in FIGS. 4A~4E, even in the condition where the ignition timing is retarded by a large amount from the compression top dead center. Moreover in this case, while the temperature rise for the exhaust purifying catalyst is required, the catalyst's temperature rise control can be performed without varying its load by correcting the intake air quantity of the engine to be smaller and/or correcting the fuel injection quantity to be larger than the normal driving where the temperature rise is not required.

Furthermore in this embodiment, when the temperature rise for the exhaust purifying catalyst is required, the time for sufficiently evaporating the injected fuel can be secured by setting the time interval between the fuel injection timing and the ignition timing to be longer than the normal driving where the temperature rise is not required. Thereby, the constantly stable ignitability can be secured, and amounts of the smoke and the HC which flows on the wall can be reduced. By virtue of the above-mentioned configurations, the early activation of the exhaust purifying catalyst in the direct-injection and spark-ignition type internal combustion engine can be promoted, for example during all the time period from the start of the engine to the completion of the exhaust purifying catalyst's activation, with the HC emission into the atmosphere being suppressed.

Figure 5A:
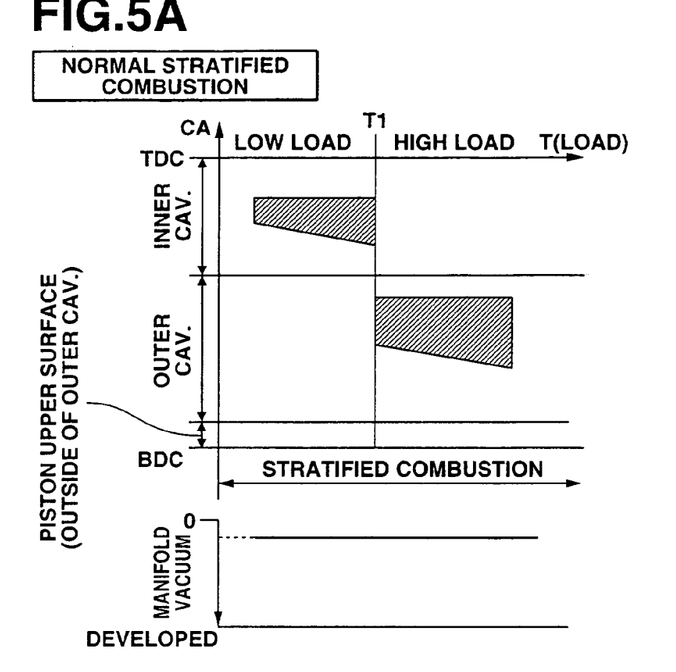
FIGS. 5A and 5B are control characteristic views in a second embodiment of the exhaust emission control apparatus according to the present invention.
Figure 5B:
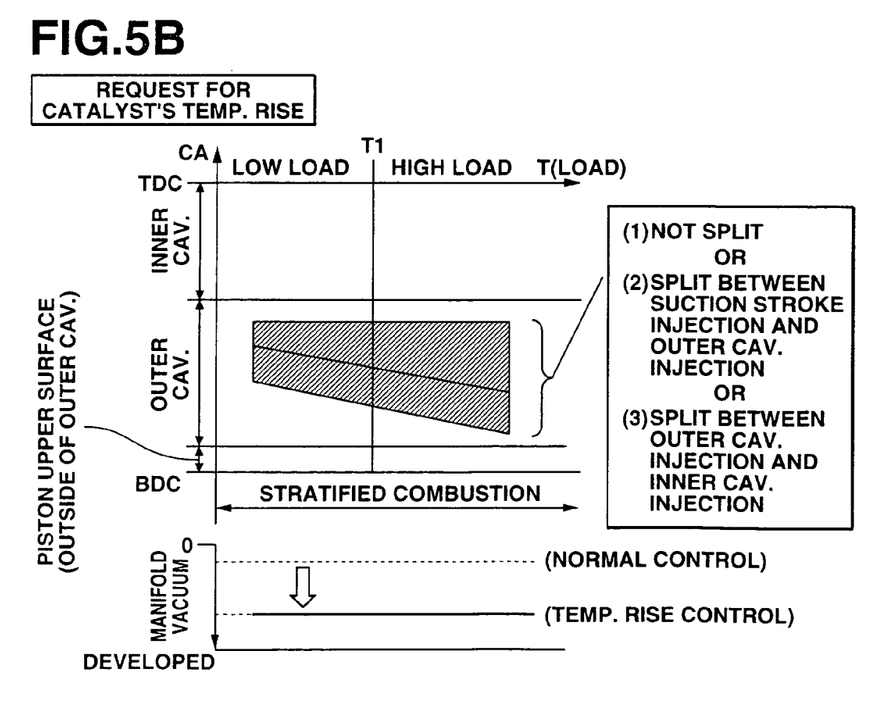

In the next, a second embodiment of the exhaust emission control apparatus according to the present invention will now be explained. Since a schematic configuration of the second embodiment is in the same manner as the configuration of the first embodiment (as shown in FIG. 1), the explanation thereof will be omitted from the following discussion. FIG. 5A shows a control for the fuel injection timing and fuel injection quantity relative to the engine load in the case of the normal stratified charge combustion, in the second embodiment according to the present invention. FIG. 5B shows a control for the fuel injection timing and fuel injection quantity relative to the engine load in the case where the catalyst's temperature rise is required, in the second embodiment according to the present invention. The case of the normal stratified charge combustion (FIG. 5A) is same as FIG. 2A, hence the explanation thereof will be omitted. In the case where the catalyst's temperature rise is required (FIG. 5B), a fuel quantity for enabling the air-fuel mixture formed within the outer cavity and in the area right above the outer cavity to have an air/fuel ratio richer (in terms of fuel) than the stoichiometric ratio and also capable of being ignited at its ignition timing is injected into the outer cavity under each load condition. Namely, the sum of a fuel quantity for corresponding to the load required as a work in each load region and a fuel quantity for being used for energy (i.e., afterburning) needed for the exhaust temperature rise is this total fuel injection quantity (i.e., total amount of fuel). This total fuel is injected into the outer cavity in this case. Moreover, the manifold vacuum is developed by reducing the intake air quantity as compared to that of the case of the normal stratified charge combustion, in order to cause the load (or, output power) to accord with that of the case of the normal stratified charge combustion. Namely in this case where the catalyst's temperature rise is required, the stratified charge combustion is performed without varying the engine load, while causing the average air/fuel ratio within the combustion chamber to range about from 14.4 to 18.

In this case where the catalyst's temperature rise is required in this second embodiment, there are the following three patterns as shown in FIG. 5B. Pattern 1 is a case where the total fuel quantity is injected into the outer cavity without a split of fuel. Pattern 2 is a case where a portion of the total fuel quantity (the total fuel quantity×a split ratio Ksp) is precedently injected during the suction stroke. Pattern 3 is a case where a portion of the total fuel quantity (the total fuel quantity×split ratio Ksp) is injected into the inner cavity during the latter half of the compression stroke.

Figure 6:
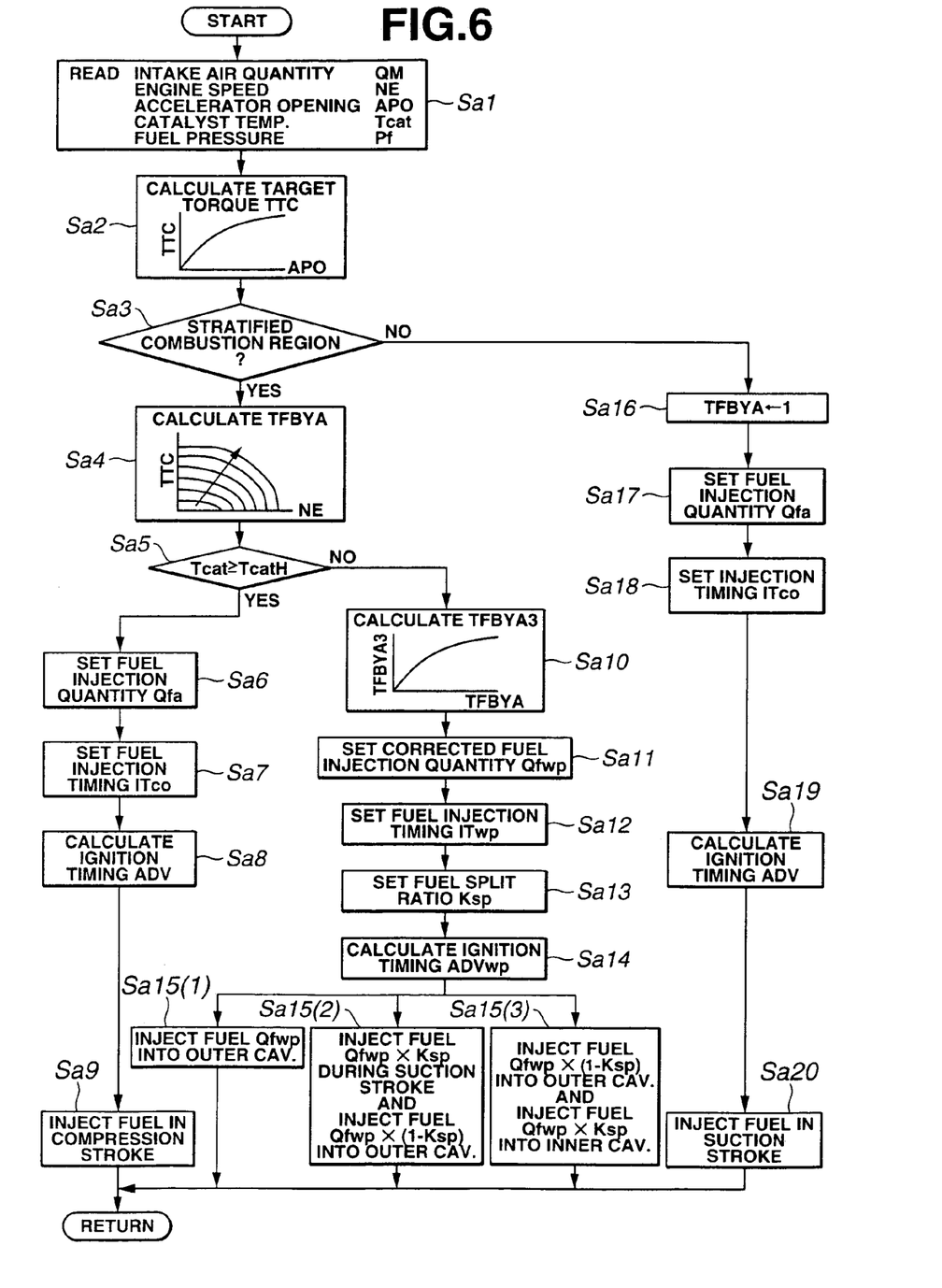
FIG. 6 is a flowchart showing a control process in the second embodiment according to the present invention.

FIG. 6 is a flowchart showing a control process in ECU 17 in this second embodiment. Steps Sa1~Sa4 are respectively same as steps S1~S4 shown in FIG. 3 except that fuel pressure Pf is also read at step Sa1. Hence, the explanation of these steps will be omitted from the following description. At next step Sa5, the controller determines whether or not current catalyst temperature Tcat is equal to or higher than catalyst's activation temperature TcatH, namely Tcat≧TcatH. If YES at step Sa5, namely if the controller determines that catalyst temperature Tcat has reached activation temperature TcatH; the program proceeds to steps Sa6–Sa9 and accordingly the normal stratified charge combustion is performed in the similar manner as steps S6~S9 shown in FIG. 3. Namely, the controller injects fuel into the inner cavity or the outer cavity of the double-layer cavity in accordance with the engine load, as shown in FIG. 5A.

If NO at step Sa5, namely if the controller determines that catalyst temperature Tcat has not reached activation temperature TcatH; the controller determines that the catalyst's temperature rise is being required, and the program proceeds to steps Sa10~Sa15. Accordingly, the controller performs the catalyst's temperature rise control for raising the exhaust temperature. In detail, the controller calculates a corrected fuel-air ratio TFBYA3 on the basis of current target fuel-air ratio TFBYA at step Sa10. Corrected fuel-air ratio TFBYA3 is calculated so that a quantity of unburned substances for being afterburned is added to fuel-air ratio TFBYA needed to produce the target torque. For the sake of efficiently increasing the exhaust temperature, corrected fuel-air ratio TFBYA3 is set to range from 0.8 to 1.0, in order to have a good balance between the quantity of incomplete combustion substances CO, H2 produced by the main combustion and the quantity of remaining oxygen existing after the main combustion.

Next at step Sa11, the controller sets corrected fuel injection quantity Qfwp according to corrected fuel-air ratio TFBYA3 (i.e., increase in fuel injection quantity). Then, the controller sets fuel injection timing ITwp as shown in FIG. 5B, at step Sa12. Then, the controller sets fuel split ratio Ksp at step Sa13. This fuel split ratio Ksp is set to range approximately from 0% to 30%, although optimum values are given in accordance with the engine speed and the load by experimental results.

At step Sa14, the controller sets ignition timing ADVwp. At this time, the controller sets ignition timing ADVwp so that ignition timing ADVwp is retarded by a maximum degree within the limit of an engine stability, since the ignition timing has a strong influence over the exhaust temperature rise. In addition, there is a fear that the combustion stability under the same condition of ignition timing deteriorates due to decrease in fuel pressure Pf. Hence, the controller sets ignition timing ADVwp so as to advance ignition timing ADVwp in accordance with fuel pressure Pf, if fuel pressure Pf is lower than a predetermined pressure. For information, although a combustion pressure is reduced by retarding the ignition timing, the controller increases the air quantity and thereby suppresses the reduction in engine output (power).

At next step Sa15, the controller carries out the fuel injection. If fuel split ratio Ksp is set for equal to 0 (namely Ksp=0), the controller injects the total fuel quantity at fuel injection timing ITwp set at step Sa12 (the above-mentioned Pattern 1). If Ksp≠0, the controller precedently injects a fuel quantity of Qfwp×Ksp during the suction stroke and then injects the remaining fuel quantity of Qfwp×(1−Ksp) at fuel injection timing ITwp (Pattern 2). Or, if Ksp≠0, the controller injects the fuel quantity of Qfwp×(1−Ksp) at fuel injection timing ITwp and afterward injects the remaining fuel quantity of Qfwp×Ksp into the inner cavity during the latter half of the compression stroke (Pattern 3).

Figure 7A:
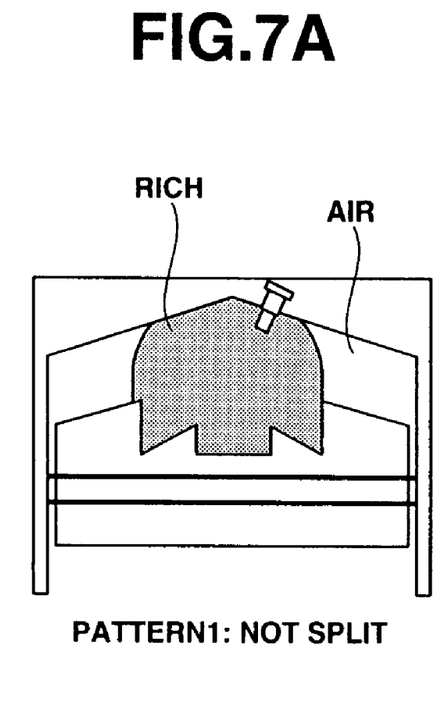
FIGS. 7A–7C are explanatory views showing distributions of air-fuel mixtures in the second embodiment according to the present invention.
Figure 7B:
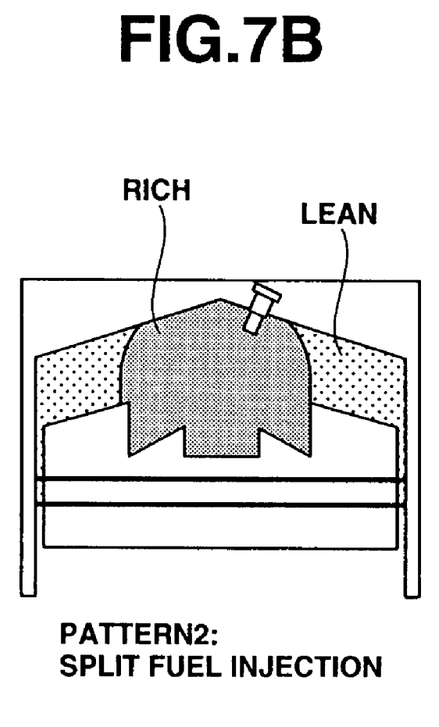
Figure 7C:
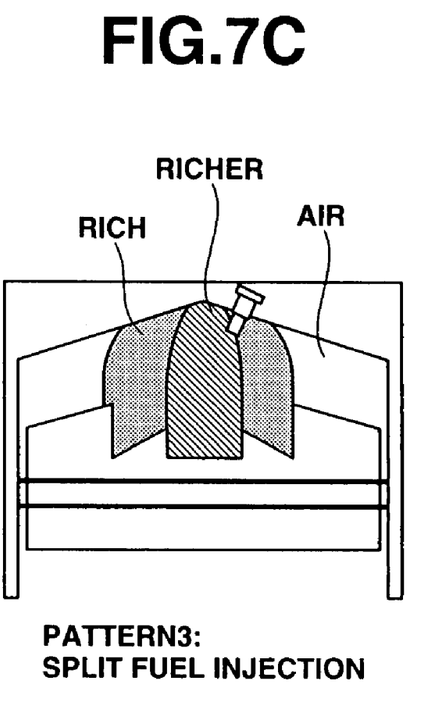

FIGS. 7A~7C show states of air-fuel mixtures at the ignition timing, with respect to these three Patterns. At the ignition timing in Pattern 1, the air-fuel mixture formed within the outer cavity and in the area right above the outer cavity has air/fuel ratio which is richer than the stoichiometric ratio and also which enables the mixture to be ignited. Besides, air exists outside of this air-fuel mixture. At the ignition timing in Pattern 2, the air-fuel mixture formed within the outer cavity and in the area right above the outer cavity has air/fuel ratio which is richer than the stoichiometric ratio and also which enables the mixture to be ignited. Besides, lean air-fuel mixture exists outside of this air-fuel mixture. At the ignition timing in Pattern 3, the air-fuel mixture formed within the outer cavity and in the area right above the outer cavity has air/fuel ratio which is richer than the stoichiometric ratio. Moreover, an inner air-fuel mixture having air/fuel ratio which is still richer than the air/fuel ratio formed within the outer cavity and in the area right above the outer cavity and also which enables this inner mixture to be ignited is formed within the inner cavity and in the area right above the inner cavity. Besides, air exists outside of these inner and outer air-fuel mixtures.

Steps Sa16~Sa20 are respectively same as steps S16~S20 shown in FIG. 3, hence the explanation of these steps will be omitted.

In this embodiment, such a split injection is carried out in steps Sa15(2) and Sa15(3) although corrected fuel injection quantity Qfwp is a quantity capable of being injected into the outer cavity at one time (with respect to the combustion stability and smoke generation etc.). However in the exhaust emission control apparatus according to the present invention, when the calculated corrected fuel injection quantity Qfwp becomes larger than the quantity capable of being injected into the outer cavity at one time; the controller may inject its maximum quantity capable of being injected into the outer cavity at one time, into the outer cavity, and inject the remaining fuel during the suction stroke or inject the remaining fuel into the inner cavity during the latter half of the compression stroke.

In this second embodiment, while the catalyst's temperature rise is required in the stratified charge combustion mode, the average air/fuel ratio within the combustion chamber is set to range from stoichiometric to weakly lean, concretely range about from 14.4 to 18. This setting can keep a balance between the quantity of incomplete combustion substances CO, H2 produced by the main combustion and the quantity of remaining oxygen existing after the main combustion. Thereby, the exhaust gas temperature can be effectively increased. In particular when the average air/fuel ratio within the combustion chamber is set to substantially stoichiometric ratio, the quantity of incomplete combustion substances and the quantity of remaining oxygen almost provide an equivalence point, hence increase efficiency in the exhaust gas temperature becomes its best.

Further in this embodiment, when the temperature rise for the exhaust purifying catalyst is required, the ignition timing is set to the more retarded side than that at the time of the normal stratified charge combustion where the temperature rise for the exhaust purifying catalyst is not required. Thereby, the exhaust gas temperature can be more increased, and moreover the HC emission can be more suppressed because of the further enhanced promoting effect in afterburning. For information, the ignition timing may be set to be retarded by a maximum degree within the limit of the engine stability.

Further in this embodiment, when the temperature rise for the exhaust purifying catalyst is required, a portion of the fuel quantity is precedently injected in the split form during the suction stroke. Thereby at the ignition timing, the air-fuel mixture having air/fuel ratio richer than the stoichiometric ratio is formed within the outer cavity and in the area right above the outer cavity. Moreover, the lean air-fuel mixture exists outside this rich air-fuel mixture formed within the outer cavity and in the area right above the outer cavity. In this case, the incomplete combustion substances CO and H2 are produced from the rich air-fuel mixture as a result of the main combustion. And moreover, combustion precursors (R-CHO, OH radical, and the like) having an active chemical reactivity are also produced since fuel within the outside lean air-fuel mixture partially reacts by receiving heat or some flame spread generated by the main combustion. Thereby, the reaction (re-combustion) of the substances CO and H2 occurs more vigorously in chain reaction, during the expansion stroke and the exhaust stroke. In addition, these substances also vigorously react inside the exhaust passage upstream from the catalyst. Hence, the exhaust gas temperature can be further increased, and the HC emission can be more suppressed.

Further in this embodiment, when the temperature rise for the exhaust purifying catalyst is required, a portion of the fuel quantity is injected into the inner cavity of the double-layer cavity during the latter half of the compression stroke.

Thereby at the ignition timing, the air-fuel mixture having air/fuel ratio richer than the stoichiometric ratio is formed within the outer cavity and in the area right above the outer cavity. Moreover within the inner cavity and in the area right above the inner cavity, the inner air-fuel mixture still richer than this (outer) mixture formed within the outer cavity and in the area right above the outer cavity is formed, and this inner air-fuel mixture can be ignited. Furthermore, air exists outside of these inner and outer air-fuel mixtures. Thus, since the inner air-fuel mixture has a high degree of richness, the incomplete combustion substances CO and H2 can be produced in larger quantity after the main combustion. Then, the reaction (re-combustion) of the substances CO and H2 occurs more vigorously during the expansion stroke and the exhaust stroke and also when passing inside the exhaust passage upstream from the catalyst, thereby the exhaust gas temperature can be more increased and the HC emission can be more suppressed. For information, if the total fuel quantity is injected into only the inner cavity, it is conceivable that an over-rich (too rich) mixture is locally formed and thereby the combustion stability deteriorates and/or the generation in smoke is increased.

Further in this embodiment, when the fuel pressure is lower than a required predetermined fuel pressure; the ignition timing is set to more advanced side than that in the case of the required predetermined fuel pressure, in accordance with the fuel pressure. Namely, if the fuel pressure is lower than the required predetermined fuel pressure; the ignition timing is set to be more advanced in accordance with the fuel pressure than the ignition timing of the case where the fuel pressure is equal to or higher than the required predetermined fuel pressure. Thereby the deterioration in combustion stability can be avoided, although there is a fear that the combustion stability under the same condition of ignition timing deteriorates due to reduction in fuel pressure. As benefit situations for such a configuration of this embodiment, for example when the fuel pressure has not yet reached the required predetermined value immediately after a cold start of the engine, or when the fuel pressure has been reduced due to some cause e.g. a malfunction of the high-pressure fuel pump, with the catalyst's temperature rise required; the suppression of the HC emission and the activation of the exhaust purifying catalyst can be promoted without exacerbating the combustion stability namely engine stability by virtue of such a configuration of this embodiment.

Further in this embodiment, when the temperature rise for the exhaust purifying catalyst is required, the intake air quantity is increased in accordance with the retarded setting of the ignition timing. In general, the combustion pressure is reduced due to the retardation of the ignition timing. However, by increasing the intake air quantity, the reduction in engine output can be suppressed.

In the next, a third embodiment according to the present invention will now be explained. A schematic configuration of the third embodiment is in the same manner as the configuration of the first embodiment (as shown in FIG. 1) except that catalyst temperature sensor 18 is not provided. Hence, the schematic diagram thereof will be omitted from the following explanation. In this third embodiment, the catalyst's temperature rise control is performed as one example, during the time period from the cold start to under the fast idle.

Figure 8:
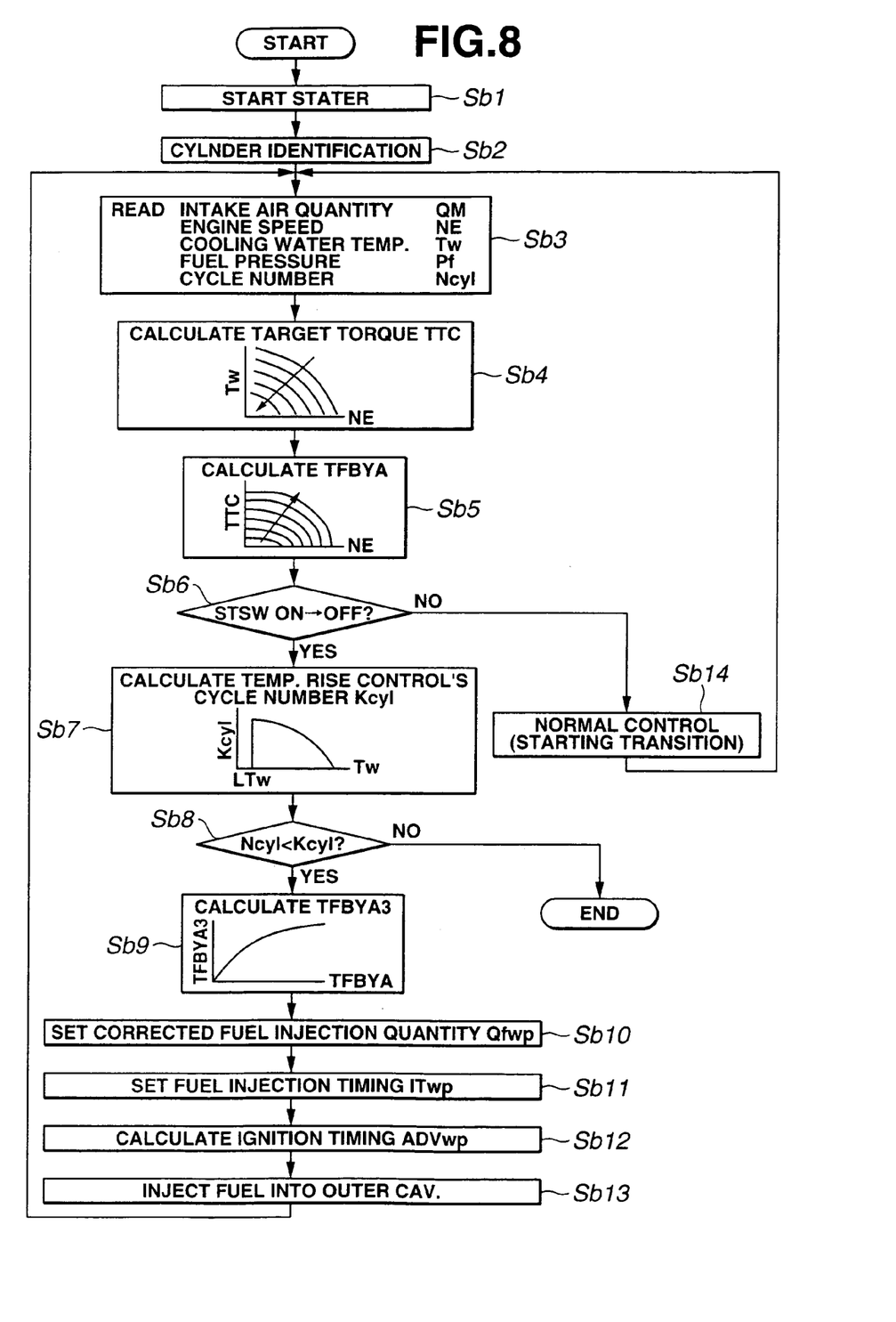
FIG. 8 is a flowchart showing a control process in a third embodiment of the exhaust emission control apparatus according to the present invention.
Figure 9A:
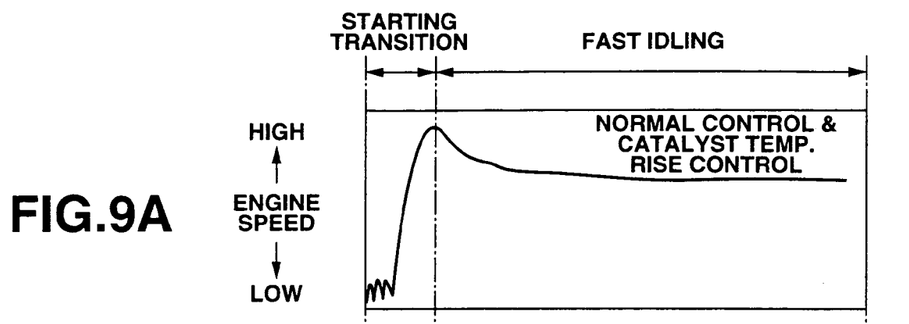
FIGS. 9A–9E are views showing effects of the third embodiment of the exhaust emission control apparatus according to the present invention.
Figure 9B:
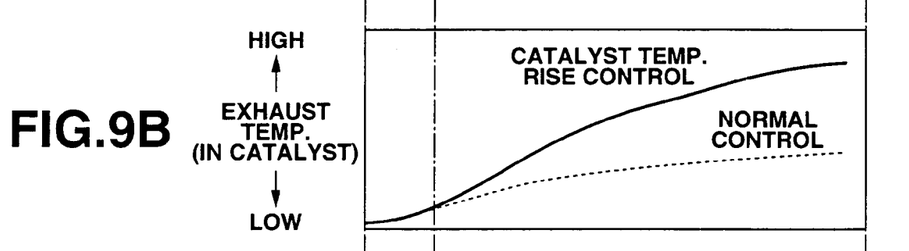
Figure 9C:
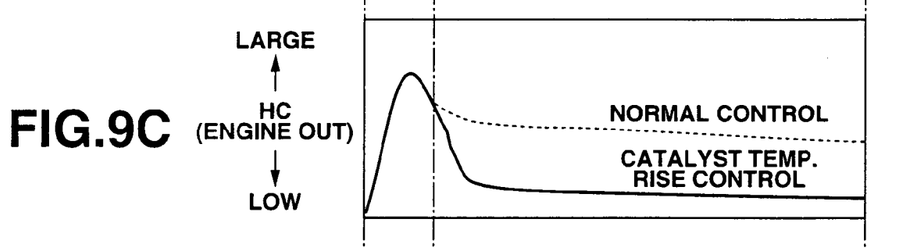
Figure 9D:
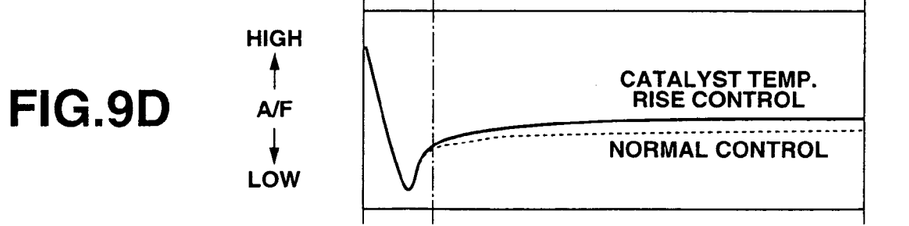
Figure 9E:
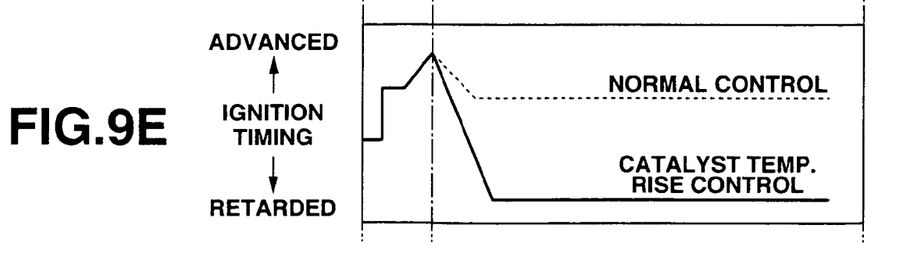

FIG. 8 is a flowchart showing a control process in ECU 17 in the third embodiment. At step Sb1, a key switch is turned ON and then a starter is started by turning the key to a start position for the starter (starter switch ON). Then the engine starts a cranking. At next step Sb2, the controller carries out a cylinder identification (discrimination) by using the crank angle sensor and a cam angle sensor which receive signals in dependence upon the engine rotation. At step Sb3, the controller reads intake air quantity QM, engine rotation speed NE, a cooling water temperature Tw, fuel pressure Pf, and an each cylinder's cycle number Ncyl counted from a first explosion. For information, this cycle number Ncyl can be determined from e.g., an injection number of the fuel injection valve or an ignition number of the ignition plug.

At next step Sb4, the controller calculates target torque TTC in accordance with engine rotation speed NE and cooling water temperature Tw. Next at step Sb5, the controller calculates target fuel-air ratio TFBYA in accordance with engine rotation speed NE and target torque TTC. Next at step Sb6, the controller judges whether or not the starter switch has been turned from ON to OFF. If the answer of step Sb6 is YES, the program proceeds to step Sb7 and then the controller calculates a cycle number of the catalyst's temperature rise control Kcyl. This Kcyl is a control cycle number which is needed for the catalyst's temperature rise control to be carried out in order to allow the catalyst to reach the activation temperature. In this embodiment, the catalyst temperature is not directly sensed (measured). Namely, the experimentally obtained relationship between the water temperature at the time of engine start and the cycle number of the catalyst's temperature rise control is previously stored in ROM of the ECU. By looking up this stored table data, the controller calculates catalyst temperature rise control's cycle number Kcyl in accordance with the water temperature at the time of engine start. Hence this embodiment has an advantage that cost increase also can be suppressed, since the catalyst temperature sensor is not necessary. Further in this embodiment, when the read water temperature Tw is lower than a predetermined temperature LTw, Kcyl=0 namely the catalyst's temperature rise control is not carried out. This predetermined temperature LTw is a temperature below which the stratified charge combustion is inappropriate to be performed from the viewpoint of the combustion stability.

At next step Sb8, the controller judges whether or not current cycle number Ncyl is lower than catalyst temperature rise control's cycle number Kcyl. If the answer of step Sb8 is YES, the program proceeds to steps Sb9~Sb13 and the controller carries out the catalyst temperature rise control. Steps Sb9~Sb11 are respectively same as steps Sa10~Sa12, step Sb12 is same as step Sa14, and step Sb13 is same as step Sa15 (1), hence the explanation of these steps will be omitted. If the answer of step Sb6 is NO, namely if the controller determines that the starter switch is under the condition of ON; the engine is under a starting transition which involves a steep increase in engine rotation speed. Hence, the program proceeds to step Sb14 and the controller carries out a normal control set for the starting transition. For the starting transition, the fuel quantity is calculated from the basic fuel injection quantity (K×QM/NE; K is a constant), target fuel-air ratio TFBYA, an increasing correction according to the cooling water temperature, an increasing correction according to the starting and after-starting timing, and the like. During the starting transition; this calculated fuel is injected in the suction stroke or in the first half of the compression stroke, and the ignition timing is set to more advanced side than the ignition timing under the case of the normal fast idle in order to achieve a favorable increase in engine speed. If the answer of step Sb8 is NO, namely if the controller determines that a relationship Ncyl≧Kcyl is established; the controller terminates the catalyst temperature rise control.

FIGS. 9A~9E show a comparison between the case where the catalyst temperature rise control according to this third embodiment is performed during the fast idle after the starting transition and the case where the normal fast idle control (the uniform (charge) combustion) is performed during the fast idle after the starting transition. Concretely, engine speed NE, the exhaust temperature at upstream side of the catalyst, the HC output from the engine, the air/fuel ratio, and the ignition timing are compared in FIGS. 9A~9E. During the interval of the starting transition of FIGS. 9A~9E, the uniform charge combustion is performed. The catalyst temperature rise control is started from the time point when an overshoot of engine speed NE has finished, and the ignition timing is gradually retarded and then is finally retarded in the vicinity of the limit of the engine stability. Further, the air/fuel ratio is set to be a little fuel-leaner than the stoichiometric ratio set under the case of the normal (fast idle) control. As a result, the exhaust temperature is effectively increased and also the engine-output HC is reduced, as shown in FIGS. 9A~9E. Therefore, the exhaust emission control apparatus according to this embodiment is remarkably advantageous after the cold start and during the fast idle.

In the present invention, it is noted that fuel injection valve 6 corresponds to injection means for injecting fuel, ignition plug 7 corresponds to ignition means for igniting the air-fuel mixture, and engine control unit (ECU) 17 corresponds to control means for carrying out the stratified charge combustion and the uniform combustion.

This application is based on a prior Japanese Patent Application No. 2004-298641 filed on Oct. 13, 2004. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An exhaust emission control apparatus for an internal combustion engine, comprising:
   a fuel injection valve placed substantially at a midpoint above a combustion chamber of the engine;
   a piston having
      an outer cavity formed substantially in a midsection of an upper surface of the piston and
      an inner cavity formed in a bottom surface of the outer cavity;
   an ignition plug placed in a region right above the outer cavity;
   an exhaust purifying catalyst provided in an exhaust passage of the engine; and
   a controller configured to carry out a stratified charge combustion when a temperature rise for the exhaust purifying catalyst is required, by
      forming an air-fuel mixture which is richer than stoichiometric ratio and is able to be ignited by the ignition plug, within the outer cavity and in an area substantially right above the outer cavity, from a fuel injected through the fuel injection valve.

2. The exhaust emission control apparatus as claimed in claim 1, wherein the controller is configured to carry out the stratified charge combustion normally under relatively high load driving condition of a predetermined driving condition in which the stratified charge combustion is carried out, by
   injecting fuel during a compression stroke and
   forming a combustible air-fuel mixture within the outer cavity and in the area substantially right above the outer cavity, and
configured to carry out the stratified charge combustion normally under relatively low load driving condition of the predetermined driving condition, by
   injecting fuel during the compression stroke and
   forming the combustible air-fuel mixture within the inner cavity and in an area substantially right above the inner cavity; and wherein the controller is
configured to carry out the stratified charge combustion when the temperature rise for the exhaust purifying catalyst is required under the relatively low load driving condition, by
   injecting fuel during the compression stroke and
   forming the air-fuel mixture which is richer than stoichiometric ratio and is able to be ignited, within the outer cavity and in the area substantially right above the outer cavity.

3. The exhaust emission control apparatus as claimed in claim 1, wherein the controller is configured to reduce an intake air quantity for the engine when the temperature rise for the exhaust purifying catalyst is required, as compared to the intake air quantity for a normal driving condition where the temperature rise for the exhaust purifying catalyst is not required.

4. The exhaust emission control apparatus as claimed in claim 1, wherein the controller is configured to increase a fuel injection quantity when the temperature rise for the exhaust purifying catalyst is required, as compared to the fuel injection quantity for a normal driving condition where the temperature rise for the exhaust purifying catalyst is not required.

5. The exhaust emission control apparatus as claimed in claim 1, wherein the controller is configured to set an average air/fuel ratio within the combustion chamber to range from stoichiometric to weakly lean, when the temperature rise for the exhaust purifying catalyst is required under a driving condition in which the stratified charge combustion is carried out.

6. The exhaust emission control apparatus as claimed in claim 1, wherein the controller is configured to set a time interval between a fuel injection timing and a ignition timing to be longer than the time interval for a normal driving condition where the temperature rise for the exhaust purifying catalyst is not required, when the temperature rise for the exhaust purifying catalyst is required.

7. The exhaust emission control apparatus as claimed in claim 1, wherein the controller is configured to set an ignition timing to be more retarded than the ignition timing for a normal driving condition where the temperature rise for the exhaust purifying catalyst is not required, when the temperature rise for the exhaust purifying catalyst is required under a driving condition in which the stratified charge combustion is carried out.

8. The exhaust emission control apparatus as claimed in claim 1, wherein the controller is configured to precedently inject a portion of a fuel injection quantity during a suction stroke in a split form, when the temperature rise for the exhaust purifying catalyst is required.

9. The exhaust emission control apparatus as claimed in claim 1, wherein the controller is configured to inject a portion of a fuel injection quantity into the inner cavity during the latter half of a compression stroke, when the temperature rise for the exhaust purifying catalyst is required.

10. The exhaust emission control apparatus as claimed in claim 1, wherein if a fuel pressure is lower than a required predetermined fuel pressure, the controller is configured to set an ignition timing to be more advanced in accordance with the fuel pressure than the ignition timing of the case where the fuel pressure is equal to or higher than the required predetermined fuel pressure, when the temperature rise for the exhaust purifying catalyst is required.

11. The exhaust emission control apparatus as claimed in claim 7, wherein the controller is configured to increase an intake air quantity in accordance with the retarded setting of the ignition timing, when the temperature rise for the exhaust purifying catalyst is required.

12. An exhaust emission control apparatus for an internal combustion engine, comprising:
- a fuel injection valve placed substantially at a midpoint above a combustion chamber of the engine;
- a piston having
  - an outer cavity formed substantially in a midsection of an upper surface of the piston and
  - an inner cavity formed in a bottom surface of the outer cavity;
- an ignition plug placed in a region right above the outer cavity;
- an exhaust purifying catalyst provided in an exhaust passage of the engine; and
- a controller configured to carry out a stratified charge combustion when a temperature rise for the exhaust purifying catalyst is required, by
  - forming an air-fuel mixture within the outer cavity and in an area substantially right above the outer cavity from a fuel injected through the fuel injection valve and
  - allowing the ignition plug to ignite the air-fuel mixture after a compression top dead center of the piston.

13. The exhaust emission control apparatus as claimed in claim 12, wherein the controller is
- configured to carry out the stratified charge combustion normally under relatively high load driving condition of a predetermined driving condition in which the stratified charge combustion is carried out, by
  - injecting fuel into the outer cavity during a compression stroke and
  - forming a combustible air-fuel mixture within the outer cavity and in the area substantially right above the outer cavity, and
- configured to carry out the stratified charge combustion normally under relatively low load driving condition of the predetermined driving condition, by
  - injecting fuel into the inner cavity during the compression stroke and
  - forming the combustible air-fuel mixture within the inner cavity and in an area substantially right above the inner cavity; and wherein the controller is
- configured to carry out the stratified charge combustion when the temperature rise for the exhaust purifying catalyst is required under the relatively low load driving condition, by
  - injecting fuel into the outer cavity during the compression stroke and
  - forming the air-fuel mixture which is richer than stoichiometric ratio and is able to be ignited, within the outer cavity and in the area substantially right above the outer cavity.

14. The exhaust emission control apparatus as claimed in claim 12, wherein the controller is configured to reduce an intake air quantity for the engine when the temperature rise for the exhaust purifying catalyst is required, as compared to the intake air quantity for a normal driving condition where the temperature rise for the exhaust purifying catalyst is not required.

15. The exhaust emission control apparatus as claimed in claim 14, wherein the controller is configured to increase a fuel injection quantity when the temperature rise for the exhaust purifying catalyst is required, as compared to the fuel injection quantity for a normal driving condition where the temperature rise for the exhaust purifying catalyst is not required.

16. The exhaust emission control apparatus as claimed in claim 15, wherein the controller is configured to set a time interval between a fuel injection timing and a ignition timing to be longer than the time interval for a normal driving condition where the temperature rise for the exhaust purifying catalyst is not required, when the temperature rise for the exhaust purifying catalyst is required.

17. The exhaust emission control apparatus as claimed in claim 12, wherein the controller is configured to set an ignition timing to be more retarded than the ignition timing for a normal driving condition where the temperature rise for the exhaust purifying catalyst is not required, when the temperature rise for the exhaust purifying catalyst is required under a driving condition in which the stratified charge combustion is carried out.

18. The exhaust emission control apparatus as claimed in claim 17, wherein if a fuel pressure is lower than a required predetermined fuel pressure, the controller is configured to set the ignition timing to be more advanced in accordance with the fuel pressure than the ignition timing of the case where the fuel pressure is equal to or higher than the required predetermined fuel pressure, when the temperature rise for the exhaust purifying catalyst is required.

19. The exhaust emission control apparatus as claimed in claim 17, wherein the controller is configured to increase an intake air quantity in accordance with the retarded setting of the ignition timing, when the temperature rise for the exhaust purifying catalyst is required.

20. An exhaust emission control apparatus for an internal combustion engine, comprising:
- injection means for injecting fuel, being placed substantially at a midpoint above a combustion chamber of the engine;
- a piston having
  - an outer cavity formed substantially in a midsection of an upper surface of the piston and
  - an inner cavity formed in a bottom surface of the outer cavity;
- ignition means for igniting an air-fuel mixture, being placed in a region right above the outer cavity;
- an exhaust purifying catalyst provided in an exhaust passage of the engine; and
- control means for carrying out a stratified charge combustion when a temperature rise for the exhaust purifying catalyst is required, by
  - forming the air-fuel mixture which is richer than stoichiometric ratio and is able to be ignited by the ignition means, within the outer cavity and in an area substantially right above the outer cavity, from the fuel injected through the injection means.

21. An exhaust emission control method for an internal combustion engine including
   a piston having
      an outer cavity formed substantially in a midsection of an upper surface of the piston and
      an inner cavity formed in a bottom surface of the outer cavity,
   an ignition plug placed in a region right above the outer cavity, and
   an exhaust purifying catalyst provided in an exhaust passage of the engine, the exhaust emission control method comprising:
carrying out a stratified charge combustion when a temperature rise for the exhaust purifying catalyst is required, by forming an air-fuel mixture which is richer than stoichiometric ratio and is able to be ignited by the ignition plug within the outer cavity and in an area substantially right above the outer cavity.

* * * * *